United States Patent
Stone (10) Patent No.: US 9,602,848 B2
(45) Date of Patent: Mar. 21, 2017

(54) OPTIMIZED CONTENT DELIVERY

(71) Applicant: COMCAST CABLE COMMUNICATIONS, LLC, Philadelphia, PA (US)

(72) Inventor: Christopher Stone, Newtown, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 423 days.

(21) Appl. No.: 13/784,163

(22) Filed: Mar. 4, 2013

(65) Prior Publication Data

US 2014/0247864 A1   Sep. 4, 2014

(51) Int. Cl.
| | |
|---|---|
| H04N 21/431 | (2011.01) |
| H04N 21/234 | (2011.01) |
| H04N 21/236 | (2011.01) |
| H04N 21/2365 | (2011.01) |

(52) U.S. Cl.
CPC ..... *H04N 21/23418* (2013.01); *H04N 21/236* (2013.01); *H04N 21/2365* (2013.01)

(58) Field of Classification Search
CPC ........... H04N 21/23418; H04N 21/236; H04N 21/2365
See application file for complete search history.

(56) References Cited

U.S. PATENT DOCUMENTS

| | | | |
|---|---|---|---|
| 4,885,775 A | 12/1989 | Lucas | |
| 6,078,328 A * | 6/2000 | Schumann | G06T 11/60 345/418 |
| 6,252,590 B1 * | 6/2001 | Sawai | G06F 3/14 345/667 |
| 6,621,870 B1 | 9/2003 | Gordon et al. | |
| 7,127,737 B1 | 10/2006 | Bayrakeri et al. | |
| 7,433,406 B2 | 10/2008 | Bayrakeri et al. | |
| 7,712,045 B2 * | 5/2010 | LeMay et al. | 715/788 |
| 7,810,116 B2 | 10/2010 | Gordon et al. | |
| 8,191,065 B2 | 5/2012 | Frank | |
| 8,990,845 B2 * | 3/2015 | Moon | H04N 21/222 725/22 |
| 2010/0211987 A1 | 8/2010 | Chou | |

\* cited by examiner

*Primary Examiner* — Christopher Findley
(74) *Attorney, Agent, or Firm* — Banner & Witcoff, Ltd.

(57) ABSTRACT

Data (e.g., images, video, data fields, character strings, logos, etc.) may be analyzed to identify common elements and differentiating elements, and the elements may be respectively transmitted using different streams. For example, if two devices are receiving two video images that are nearly the same, a first data stream comprising the one or more identified common elements may be sent to them both, a second data stream comprising a portion of the one or more identified differentiating elements may be transmitted to the first device, and a third data stream comprising a different portion of the one or more identified differentiating elements may be transmitted to the second device.

20 Claims, 10 Drawing Sheets

OPTIMIZED CONTENT DELIVERY

BACKGROUND

Delivery of digital images and other content consumes network resources (e.g., bandwidth). Because such resources are limited, there remains an ever-present need to conserve network resources, especially when delivering resource-intensive visual images.

SUMMARY

In accordance with one or more aspects of the disclosure, data (e.g., images, video, data fields, character strings, logos, etc.) may be analyzed to identify common elements and differentiating elements, and the elements may be respectively transmitted using different streams. For example, if two devices are receiving two video images that are nearly the same, a first data stream comprising the one or more identified common elements may be sent to them both, a second data stream comprising a portion of the one or more identified differentiating elements may be transmitted to the first device, and a third data stream comprising a different portion of the one or more identified differentiating elements may be transmitted to the second device.

In some embodiments, the first data stream, the second data stream, and the third data stream may comprise elementary streams of a Moving Picture Experts Group Transport Stream (MPEG-TS). In such embodiments, communicating the first data stream to the first and second device, communicating the second data stream to the first device, and communicating the third data stream to the second device, may comprise communicating the MPEG-TS to the first device and the second device. The MPEG-TS may include a Program Map Table (PMT), which may include a plurality of Packet Identifiers (PIDs). A first of the PIDs may identify the first data stream. A second of the PIDs may identify the second data stream. A third of the PIDs may identify the third data stream. In some embodiments, the second of the PIDs may comprise an account identifier associated with the first device, an Internet Protocol (IP) address associated with the first device, and/or a Media Access Control (MAC) address associated with the first device. Additionally or alternatively, the third of the PIDs may comprise an account identifier associated with the second device, an IP address associated with the second device, and/or a MAC address associated with the second device.

In some embodiments, the first device may receive the first data stream and the second data stream. The first device may combine images from these streams to render an image comprising the identified one or more common elements and the portion of the identified one or more differentiating elements associated with the data received by the first device. Additionally or alternatively, the second device may receive the first data stream and the third data stream. The second device may combine portions or characteristics of the images from these streams and render an image comprising the identified one or more common elements and the portion of the identified one or more differentiating elements associated with the second device.

In some embodiments, a determination may be made as to whether the one or more common elements comprise a threshold proportion of the plurality of images, and the first data stream, second data stream, and third data stream may be generated responsive to determining that the one or more common elements comprise the threshold proportion of the plurality of images. In some embodiments, the threshold proportion may be determined based on a total number of the plurality of images.

In some embodiments, the first data stream may comprise one or more I-frames, and the second and third data streams may comprise one or more P-frames and/or one or more B-frames. The first device may receive the first data stream and the second data stream, and may render an image comprising the one or more common elements and the portion of the one or more differentiating elements associated with the first device by altering one or more images specified by the one or more I-frames as specified by the one or more P-frames and/or the one or more B-frames. Additionally or alternatively, the second device may receive the first data stream and the third data stream, and may render an image comprising the one or more common elements and the portion of the one or more differentiating elements associated with the second device by altering one or more images specified by the one or more I-frames as specified by the one or more P-frames and/or the one or more B-frames.

In some embodiments, each of the plurality of images may comprise a User Interface (UI), such as a menu (e.g., a social media service interface), program listing, or other display. In an example of a program listing, the one or more common elements of the plurality of images may comprise one or more of a background image, a component image, a logo, and/or a border seen by multiple users accessing the program listing, and the one or more differentiating elements of the plurality of images may comprise one or more elements of the portion of the program listing that a particular user is viewing (e.g., if one viewer is viewing listings for channels 15-20).

In accordance with one or more additional aspects of the disclosure, a first UI associated with a first device and a second UI associated with a second device may be generated. One or more common elements shared by the first UI and the second UI may be identified. An image comprising the identified one or more common elements shared by the first UI and the second UI may be generated. The generated image comprising the identified one or more common elements shared by the first UI and second UI may be communicated to the first device and the second device.

In some embodiments, the one or more elements of the first UI that distinguish the first UI from the second UI may be communicated to the first device, and the one or more elements of the second UI that distinguish the second UI from the first UI may be communicated to the second device. The various devices may receive a custom stream containing the visual elements that are unique to them, and a common stream containing visual elements that are common to a plurality of devices.

In some embodiments, the first device may receive one stream comprising the one or more common elements shared by the first UI and the second UI, and another stream comprising the one or more elements of the first UI that distinguish the first UI from the second UI. The first device may render the first UI using the image comprising the one or more common elements and the one or more elements of the first UI that distinguish the first UI from the second UI.

In some embodiments, the second device may receive the image comprising the one or more common elements shared by the first UI and the second UI, and the one or more elements of the second UI that distinguish the second UI from the first UI. The second device may render the second UI using the image comprising the one or more common elements and the one or more elements of the second UI that distinguish the second UI from the first UI.

In accordance with one or more further aspects of the disclosure, an apparatus comprising at least one processor and a memory may be provided. The memory may store instructions that when executed by the at least one processor configure the apparatus to identify one or more elements shared by a first UI and a second UI. The memory may further store instructions that when executed by the at least one processor configure the apparatus to communicate the one or more elements shared by the first UI and the second UI to a first device associated with the first UI and a second device associated with the second UI. In some embodiments, the one or more elements shared by the first UI and the second UI may be communicated to the first device and the second device via a common data stream. The common data stream may comprise multiple constituent data streams. A first of the constituent data streams may comprise the one or more elements shared by the first UI and the second UI. A second of the constituent data streams may comprise one or more elements of the first UI that distinguish the first UI from the second UI. A third of the constituent data streams may comprise one or more elements of the second UI that distinguish the second UI from the first UI.

This summary is not intended to identify critical or essential features of the disclosure, but merely to summarize certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which.

DETAILED DESCRIPTION

Figure 1:
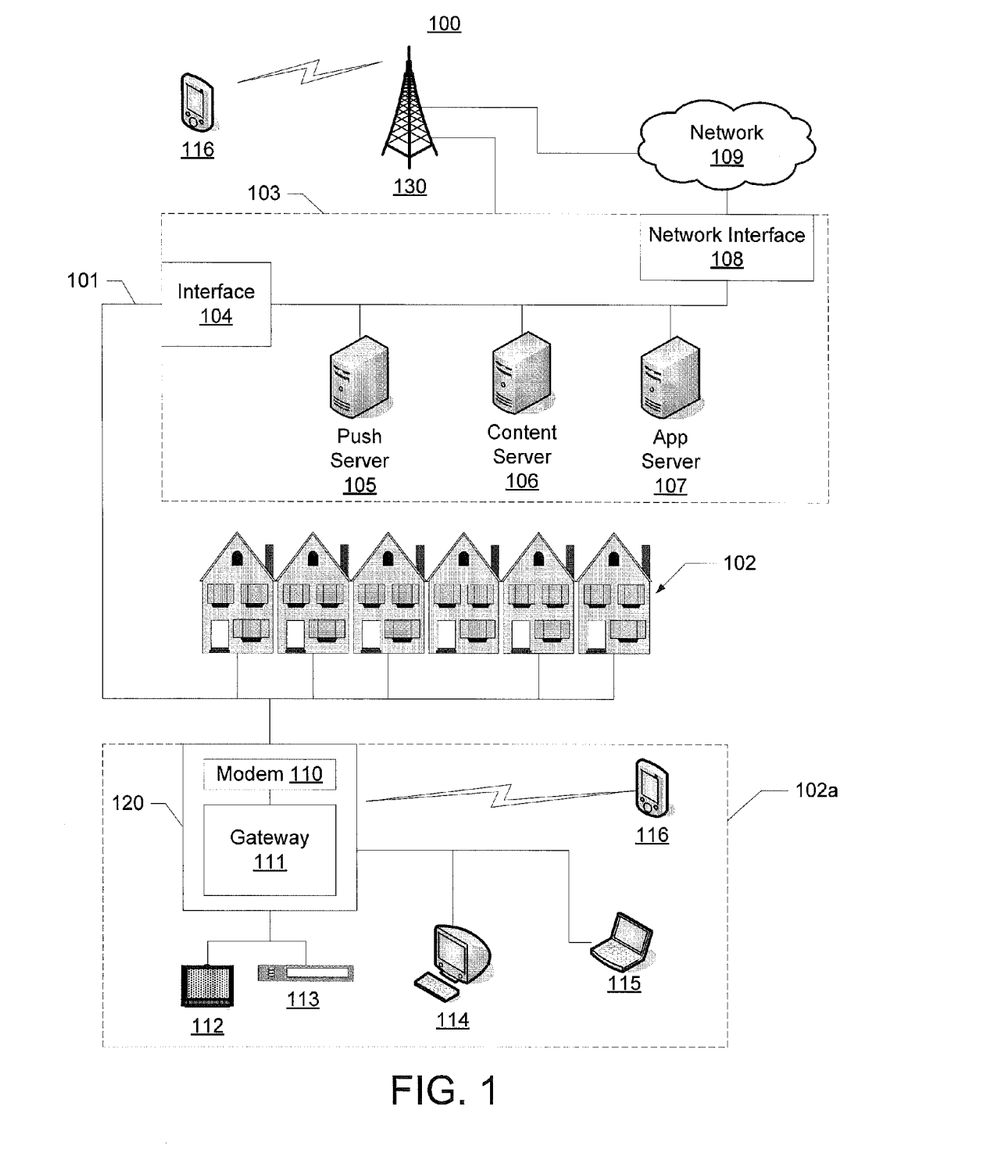
FIG. 1 depicts an illustrative network environment in which one or more aspects of the disclosure may be implemented.

FIG. 1 illustrates an example information distribution network 100 in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

Network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, network 100 may be a cellular broadband network communicating with multiple communications access points, such as wireless communications tower 130. In another example, network 100 may be a coaxial system comprising a Cable Modem Termination System (CMTS) communicating with numerous gateway interface devices (e.g., gateway interface device 111 in example home 102a). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes local office 103 communicating with numerous gateway interface devices. In another example, network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

Network 100 may use a series of interconnected communication links 101 (e.g., coaxial cables, optical fibers, wireless links, etc.) to connect premises such as homes 102 or other user environments to local office 103. Communication links 101 may include any wired communication links, wireless communication links, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other components for communicating data. Data may include, for example, Internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

Local office 103 may transmit downstream information signals onto communication links 101, and premises such as home 102 may receive and process those signals. In certain implementations, communication links 101 may originate from local office 103 as a single communications path, and may be split into any number of communication links to distribute data to homes 102 and various other destinations. Although the term home is used by way of example, homes 102 may include any type of user environment, such as single family homes, apartment complexes, businesses, schools, hospitals, parks, and other environments and combinations of environments.

Local office 103 may include interface 104, which may be a computing device configured to manage communications between devices on the network of communication links 101 and backend devices, such as server 105, server 106, and server 107. For example, interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in homes 102, and to receive upstream communications from those modems on one or more upstream frequencies.

Local office 103 may include one or more network interfaces 108 for communicating with one or more external networks 109. One or more external networks 109 may include, for example, one or more telecommunications networks, Internet Protocol (IP) networks, cellular communications networks (e.g., Global System for Mobile Communications (GSM), Code Division Multiple Access (CDMA), and any other 2nd, 3rd, 4th, or higher generation cellular communications networks), cellular broadband networks, radio access networks, fiber-optic networks, local wireless networks (e.g., Wi-Fi, WiMAX), satellite networks, and any other networks or combinations of networks.

Local office 103 may include a variety of servers that may be configured to perform various functions. Local office 103 may include one or more push servers 105 for generating push notifications to deliver data, instructions, or both to devices that are configured to detect such notifications. Local office 103 may include one or more content servers 106 configured to provide content (e.g., media content) to devices. Local office 103 may include one or more application servers 107.

Homes 102 such as home 102a may include an interface 120, which may include device 110, for communicating on communication links 101 with local office 103, one or more external networks 109, or both. For example, device 110 may be a coaxial cable modem (for coaxial cable links 101), a broadband modem (for DSL links 101), a fiber interface node (for fiber-optic links 101), or any other device or combination of devices. In certain implementations, device 110 may be a part of, or communicatively coupled to, gateway interface device 111. Gateway 111 may be, for example, a wireless router, a set-top box, a computer server, or any other computing device or combination.

Gateway interface device 111 may be any computing device for communicating with device 110 to allow one or more other devices in example home 102a to communicate with local office 103, one or more external networks 109, or other devices communicatively coupled thereto. Gateway 111 may include local network interfaces to provide communication signals to client devices in or near example home 102a, such as television 112, set-top box 113, personal computer 114, laptop computer 115, wireless device 116 (e.g., a wireless laptop, a tablet computer, a mobile phone, a portable gaming device), vehicular computing system 117 (e.g., a mobile computing system, navigation system, or entertainment system in an automobile, marine vessel, or aircraft) and any other device.

Figure 2:
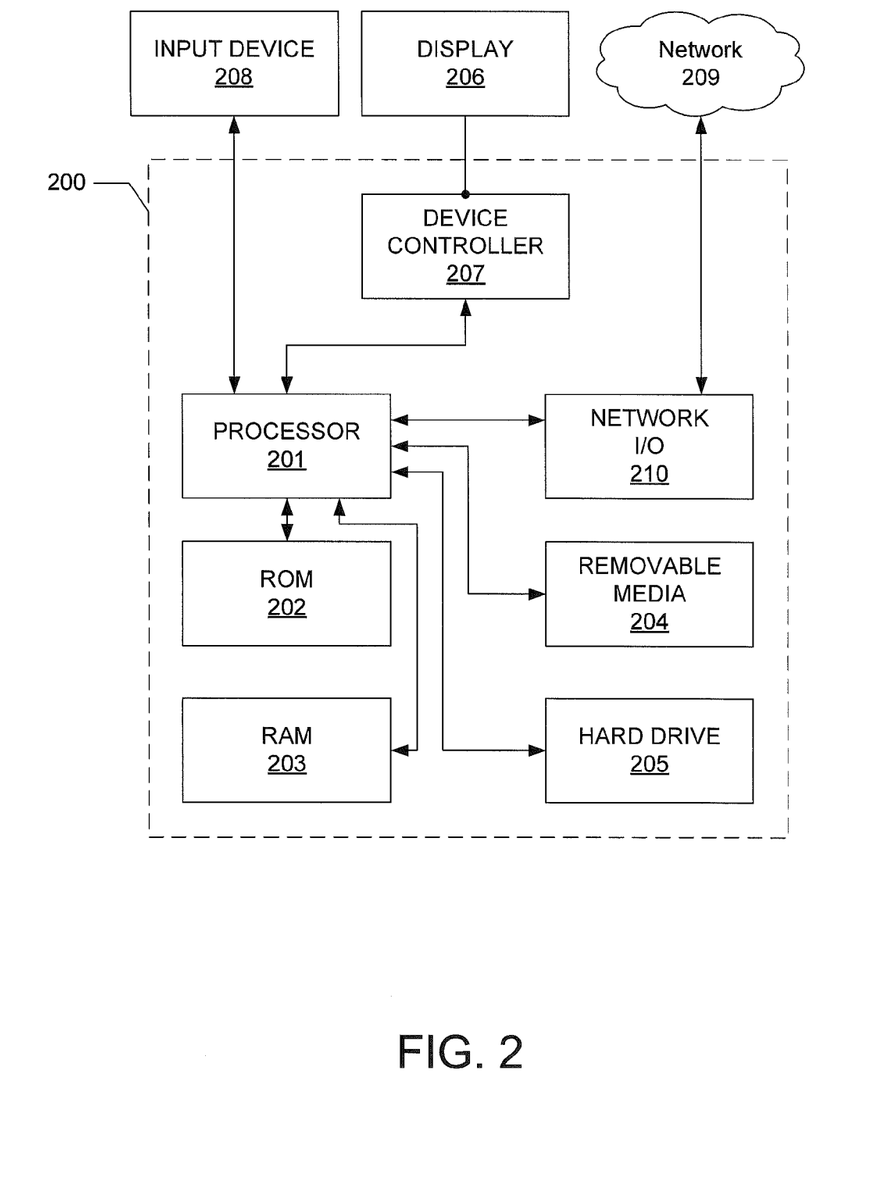
FIG. 2 depicts an illustrative software and hardware device on which various aspects of the disclosure may be implemented.

FIG. 2 illustrates general hardware elements and software elements that can be used to implement any of the various computing devices and/or software discussed herein. Device 200 may include one or more processors 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, Random Access Memory (RAM) 203, removable media 204, such as a Universal Serial Bus (USB) drive, Compact Disk (CD) or Digital Versatile Disk (DVD), hard drive, floppy disk drive, or any other desired electronic storage medium. Instructions may also be stored in hard drive 205, which may be an internal or external hard drive.

Device 200 may include one or more output devices, such as a display 206, such as an external monitor or television, and may include one or more output device controllers 207, such as a video processor. In some embodiments, device 200 may include one or more user input devices 208, such as a remote control, keyboard, mouse, touch screen, microphone, or any other input device.

Device 200 may also include one or more network interfaces, such as network Input/Output (I/O) interface 210 to communicate with an external network 209. The network interface may be a wired interface, wireless interface, or a combination of the two. In some embodiments, network I/O interface 210 may include a cable modem, and network 209 may include the communication links 101 shown in FIG. 1, one or more external networks 109, an in-home network, a provider's wireless, coaxial, fiber, or hybrid fiber/coaxial distribution system (e.g., a DOCSIS network), or any other desired network.

Figure 3:
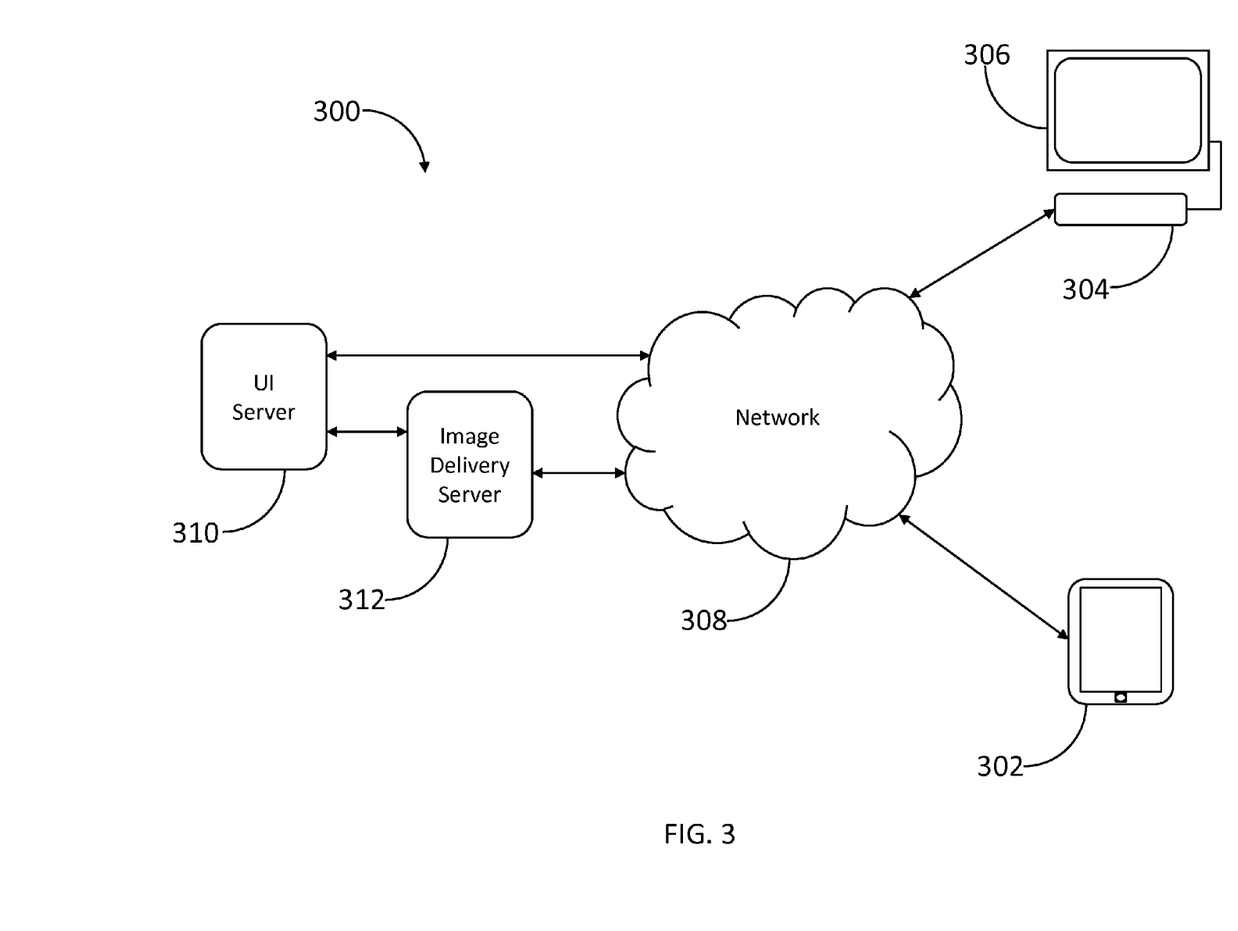
FIG. 3 depicts an illustrative network environment for employing systems and methods in accordance with one or more aspects of the disclosure.

FIG. 3 depicts an illustrative network environment for employing systems and methods in accordance with one or more aspects of the disclosure. Referring to FIG. 3, network environment 300 may include one or more user devices. For example, network environment 300 may include user devices 302 and 304. User devices 302 and 304 may be any device configured to render an image or video for display (e.g., a television, set-top box, digital video recorder, desktop computer, laptop computer, tablet computer, smart phone, etc.). For example, user device 302 may be a tablet computer, and user device 304 may be a set-top box, which may be associated with television 306. User device 302 and/or user device 304 may be configured to receive one or more data streams containing video or images for display. For example, user device 302 and/or user device 304 may receive one or more data streams via network 308. Data streams communicated to user device 302 and/or user device 304 may include one or more images and/or video, which user device 302 and/or user device 304 may render for display. For example, UI server 310 may be part of a networked digital video recorder (nDVR) service, and may provide program listing screens and recording interface screens to users who wish to peruse program listings and select programs for remote recording. The screens shown to these users may be generated by the UI server 310, and for a large group of users, many of their respective screens may have redundant images with one another. For example, a common advertisement or onscreen graphic may appear across a large number of the screens that the users are viewing. As will be discussed in greater detail below, network environment 300 may also include image delivery server 312. Any of user device 302, user device 304, UI server 310, and/or image delivery server 312 may include one or more hardware and/or software elements for implementing one or more of the functions described herein. For example, user device 302, user device 304, UI server 310, and/or image delivery server 312 may include one or more of the hardware and/or software elements discussed above with respect to FIG. 2.

Image delivery server 312 may be configured to compare the visual elements of a plurality of screen images that are needed by its users, and identify one or more common elements from those screen images. For example, the screen images may both be a program listing and recording screen for the nDVR service, and image delivery server 312 may be configured to identify one or more common elements of the UI that are to be displayed by both user device 302 and user device 304. Image delivery server 312 may also be configured to identify one or more differentiating elements of the images, or visual elements that are unique to respective user devices (or at least are not in common between the devices—they may well be in common with other devices). For example, the two users may both be viewing the program listing screen for the nDVR service, and may see the same page heading, banner advertisement and grid background, but they may differ in the actual listings being viewed. One user may be looking at channels 5-20, while another user may be looking at the listings for channels 20-35. The differentiating elements here may be the different channel listings (e.g., the channel 5-20 listing for one user, and the channel 20-35 listing for the other), while the common elements may be the heading, background and grid.

Image delivery server 312 may further be configured to generate a first data stream comprising the identified one or more common elements of the images (e.g., the page header, banner advertisement and grid background mentioned above), and one or more additional data streams containing the visual elements that were unique to the user devices. For example, both devices 302 and 304 may receive the first stream with the common elements, and each device may receive a separate, custom, stream containing the elements that are unique to their respective displays. Using the example above, the first device may receive a second stream containing the listings for channels 5-20, and the second device may receive a stream containing the listings for channels 20-35.

Figure 4:
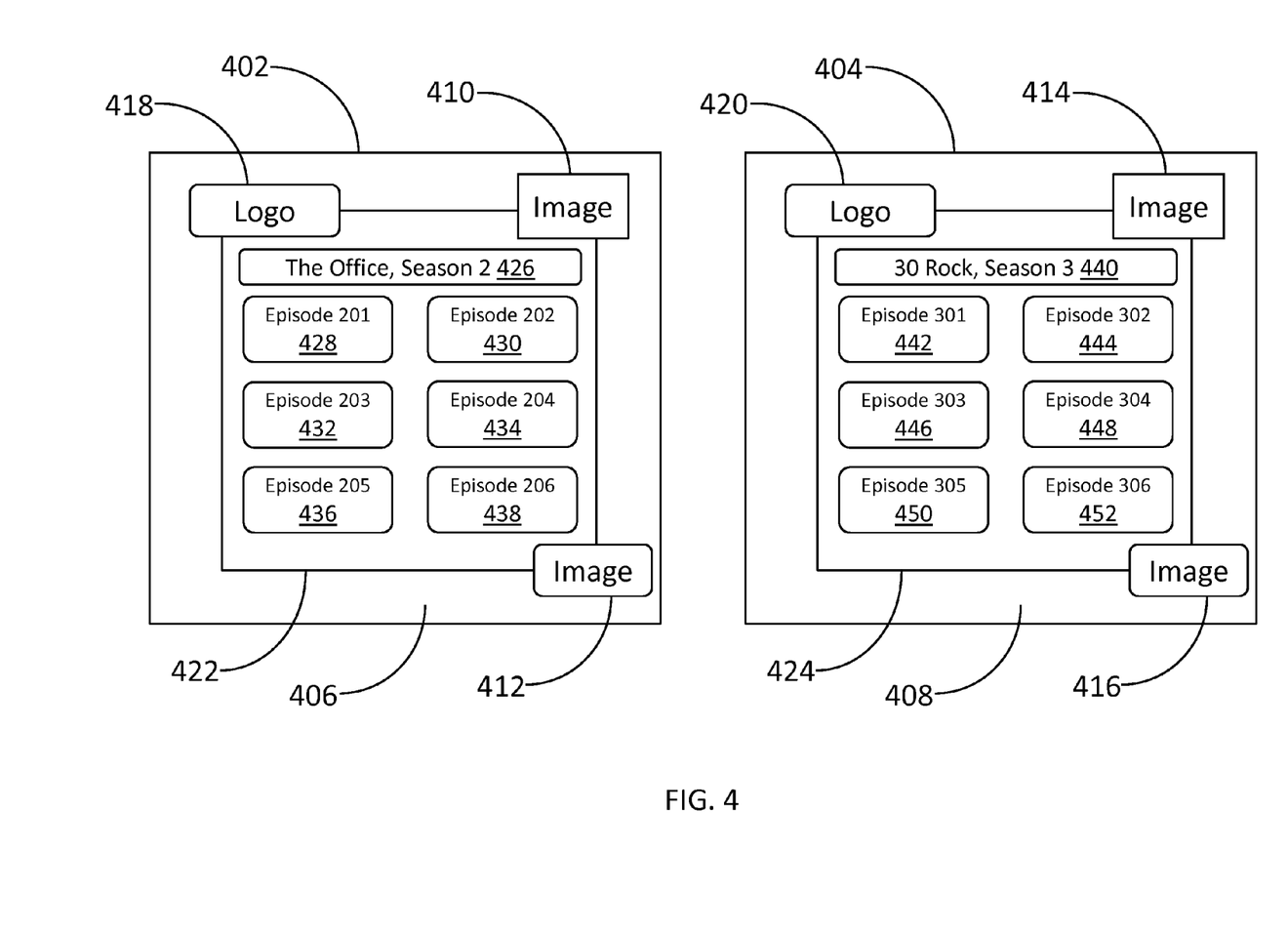
FIG. 4 depicts illustrative images in accordance with one or more aspects of the disclosure.

FIG. 4 depicts illustrative images in accordance with one or more aspects of the disclosure. Referring to FIG. 4, images 402 and 404 may include one or more common elements and/or one or more differentiating elements. For example, image 402 may comprise a UI for user device 302, and image 404 may comprise a UI for user device 304.

As indicated above, images 402 and 404 may include one or more common elements. A common element may be an element shared by both image 402 and image 404. For example, image 402 may include one or more of a background image, a component image, a logo, and/or a border that is also included in image 404. For example, image 402's background image 406 may correspond to image 404's background image 408; image 402's component images 410 and 412 may respectively correspond to image 404's component images 414 and 416; image 402's logo 418 may correspond to image 404's logo 420; and/or image 402's border 422 may correspond to image 404's border 424.

Images 402 and 404 may also include one or more differentiating elements. A differentiating element may be an element of image 402 that distinguishes image 402 from image 404 and/or an element of image 404 that distinguishes image 404 from image 402. In other words, elements that are not in common between the two. For example, image 402's UI for user device 302 may include a program listing, which may contain one or more elements that are different from the program listing shown on device 304. For example, one or more of image 402's menu title element 426, grid element 428, grid element 430, grid element 432, grid element 434, grid element 436, and/or grid element 438 may respectively differ from one or more of image 404's menu title element 440, grid element 442, grid element 444, grid element 446, grid element 448, grid element 450, and/or grid element 452, and thus may distinguish or differentiate image 402 from image 404, or vice versa.

Figure 5A:
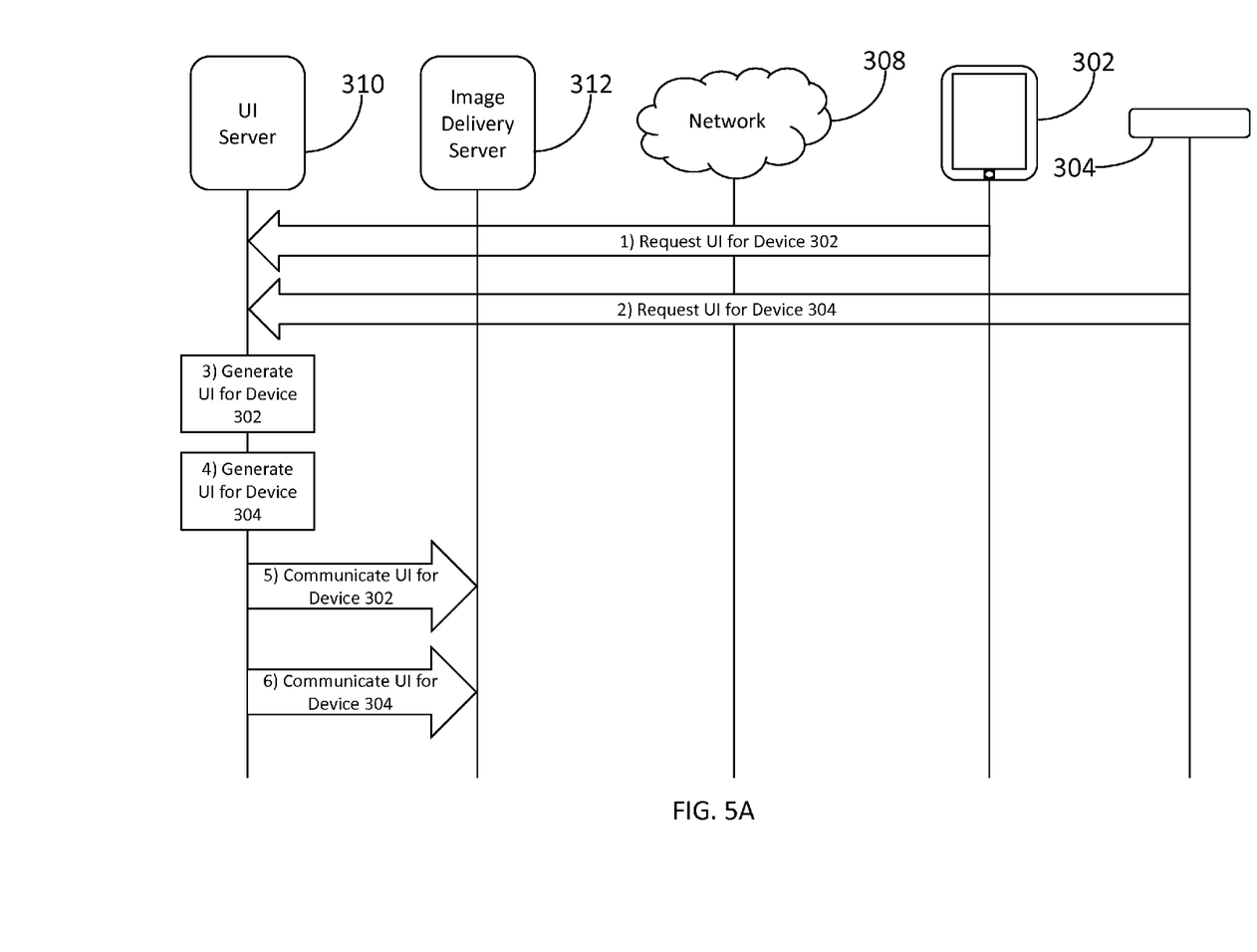
FIGS. 5A and 5B depict an illustrative sequence in accordance with one or more aspects of the disclosure.

FIGS. 5A and 5B depict an illustrative sequence in accordance with one or more aspects of the disclosure. Referring to FIG. 5A, at step 1, user device 302 may communicate a UI request to UI server 310. At step 2, user device 304 may communicate a UI request to UI server 310. At step 3, UI server 310 may generate an image comprising a UI for user device 302. For example, UI server 310 may generate image 402. At step 4, UI server 310 may generate an image comprising a UI for user device 304. For example, UI server 310 may generate image 404. At step 5, UI server 310 may generate a data stream comprising image 402 and may communicate the data stream to image delivery server 312. At step 6, UI server 310 may generate a data stream comprising image 404 and may communicate the data stream to image delivery server 312.

Figure 5B:
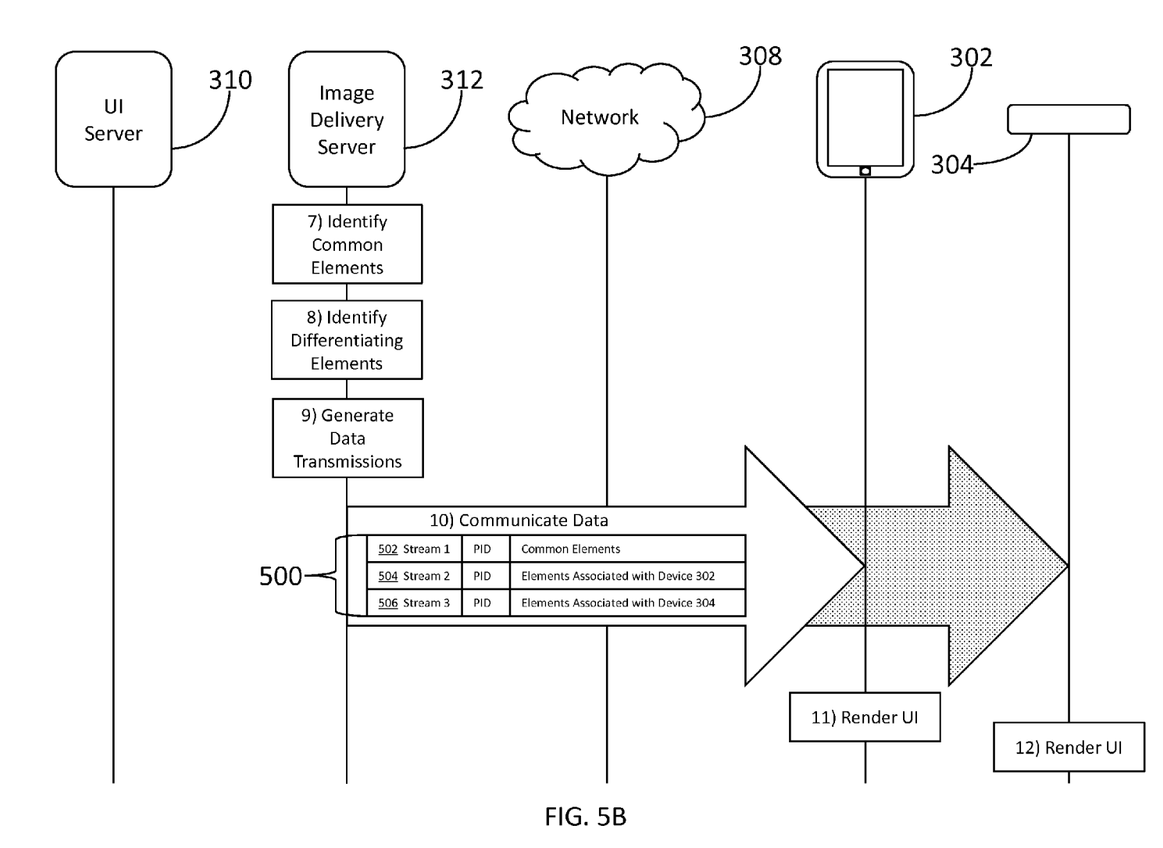

Referring to FIG. 5B, at step 7, image delivery server 312 may identify one or more common elements of images 402 and 404. For example, image delivery server 312 may compare images 402 and 404 and may determine that image 402's background image 406 is the same as image 404's background image 408, that image 402's component images 410 and 412 respectively correspond to image 404's component images 414 and 416, that image 402's logo 418 corresponds to image 404's logo 420, and that image 402's border 422 corresponds to image 404's border 424. At step 8, image delivery server 312 may identify one or more differentiating elements of images 402 and 404. For example, image delivery server 312 may compare images 402 and 404 and may determine that image 402's menu title element 426, grid element 428, grid element 430, grid element 432, grid element 434, grid element 436, and grid element 438 respectively differ from image 404's menu title element 440, grid element 442, grid element 444, grid element 446, grid element 448, grid element 450, and grid element 452.

At step 9, image delivery server 312 may generate one or more data transmissions. For example, image delivery server 312 may generate a first data stream comprising the identified one or more common elements of images 402 and 404 (e.g., a data stream comprising: image 402's background image 406, corresponding to image 404's background image 408; image 402's component images 410 and 412, respectively corresponding to image 404's component images 414 and 416; image 402's logo 418, corresponding to image 404's logo 420; and image 402's border 422, corresponding to image 404's border 424). Image delivery server 312 may also generate a second data stream comprising a portion of the identified differentiating elements of images 402 and 404 associated with user device 302 (e.g., one or more elements of image 402 that distinguish image 402 from image 404). For example, image delivery server 312 may generate a data stream comprising image 402's menu title element 426, grid element 428, grid element 430, grid element 432, grid element 434, grid element 436, and grid element 438. Image delivery server 312 may further generate a third data stream comprising a portion of the identified differentiating elements of images 402 and 404 associated with user device 304 (e.g., one or more elements of image 404 that distinguish image 404 from image 402). For example, image delivery server 312 may generate a data stream comprising image 404's menu title element 440, grid element 442, grid element 444, grid element 446, grid element 448, grid element 450, and grid element 452.

At step 10, image delivery server 312 may communicate, via network 308, the first data stream to user devices 302 and 304, the second data stream to user device 302, and the third data stream to user device 304. In some embodiments, the first data stream, second data stream, and third data stream may be multiplexed into a single data stream. For example, the first, second, and third data streams may be multiplexed into a single MPEG-TS. For example, the first data stream comprising the identified one or more common elements of images 402 and 404, the second data stream comprising the portion of the identified differentiating elements of images 402 and 404 associated with user device 302, and the third data stream comprising the portion of the identified differentiating elements of images 402 and 404 associated with user device 304 may be multiplexed into MPEG-TS 500, which may comprise: elementary stream 502, corresponding to the first data stream comprising the identified one or more common elements of images 402 and 404; elementary stream 504, corresponding to the second data stream comprising the portion of the identified differentiating elements of images 402 and 404 associated with user device 302; and elementary stream 506, corresponding to the third data stream comprising the portion of the identified differentiating elements of images 402 and 404 associated with user device 304.

In some embodiments, MPEG-TS 500 may include a PMT. The PMT may include one or more PIDs, each of which may be associated with an elementary stream of MPEG-TS 500. For example, the PMT may include a PID associated with each of elementary streams 502, 504, and 506. In some embodiments, one or more PIDs included in the PMT may comprise one or more of an account identifier, an IP address, and/or a MAC address associated with a device that is associated with the corresponding elementary stream. For example, a PID corresponding to elementary stream 502 may comprise an account identifier, an IP address, and/or a MAC address associated with user device 302, and an account identifier, an IP address, and/or a MAC address associated with user device 304. Similarly, a PID corresponding to elementary stream 504 may comprise an account identifier, an IP address, and/or a MAC address associated with user device 302, and a PID corresponding to elementary stream 506 may comprise an account identifier, an IP address, and/or a MAC address associated with user device 304.

In some embodiments MPEG-TS 500 may include control information in the form of vendor proprietary messaging where one or more messages indicate PIDs that the device should acquire in order to render the UI. For example, a message may be sent to user device 302 indicating that elementary stream 502 contains a primary video/UI element and that elementary stream 504 contains one or more secondary video/UI elements. In some embodiments, the PMT may have identifiers associated with each PID that allow the device to select applicable PIDs. For example, the PMT may contain a well-known identifier associated with a stream comprising common elements (e.g., a value of '0'), indicating to all devices that such a stream comprises common elements to be acquired for UI presentation. The PMT may also include one or more identifiers unique to each device. For example, the PMT may include an identifier associated with elementary stream 504 that indicates that it is intended for user device 302. The identifier may be encapsulated using descriptors and/or other MPEG constructs. When common elements change, user devices 302/304 may receive new messaging and/or identifiers pointing to new UI/video streams. At the encoder end, UI server 310 and/or image delivery server 312 may detect changes and if there is no common UI data, may create a unique stream specific to a user device and via the messaging protocols, inform the user device of the change.

In some embodiments, the first data stream, second data stream, and third data stream may be multiplexed into multiple data streams (not illustrated). For example, the first data stream and the second data stream may be multiplexed into a first multiplexed data stream, and the first data stream and the third data stream may be multiplexed into a second multiplexed data stream. For example, the first data stream comprising the identified one or more common elements of images 402 and 404, and the second data stream comprising the portion of the identified differentiating elements of images 402 and 404 associated with user device 302 may be multiplexed into a first multiplexed data stream, which may be communicated to user device 302; and the first data stream comprising the identified one or more common elements of images 402 and 404, and the third data stream comprising the portion of the identified differentiating elements of images 402 and 404 associated with user device 304 may be multiplexed into a second multiplexed data stream, which may be communicated to user device 304.

User device 302 may receive the first data stream and the second data stream and, at step 11, may render an image comprising the identified one or more common elements of images 402 and 404 (e.g., image 402's background image 406, image 402's component images 410 and 412, image 402's logo 418, and image 402's border 422), and the identified differentiating elements of images 402 and 404 associated with user device 302 (e.g., image 402's menu title element 426, grid element 428, grid element 430, grid element 432, grid element 434, grid element 436, and grid element 438). For example, user device 302 may receive and de-multiplex MPEG-TS 500. Having de-multiplexed, MPEG-TS 500, user device 302 may identity elementary stream 502 as comprising the identified one or more common elements of images 402 and 404 (e.g., based on the PID associated with elementary stream 502 and one or more of an account identifier, an IP address, and/or a MAC address associated with user device 302) and may identity elementary stream 504 as comprising the identified differentiating elements of images 402 and 404 associated with user device 302 (e.g., based on the PID associated with elementary stream 504 and one or more of an account identifier, an IP address, and/or a MAC address associated with user device 302). User device 302 may then render the image comprising the identified one or more common elements of images 402 and 404, and the identified differentiating elements of images 402 and 404 associated with user device 302 by combining elementary streams 502 and 504. It will be appreciated, that the image rendered by user device 302 will substantially correspond to image 402.

Similarly, user device 304 may receive the first data stream and the second data stream and, at step 12, may render an image comprising the identified one or more common elements of images 402 and 404 (e.g., image 402's background image 406, corresponding to image 404's background image 408; image 402's component images 410 and 412, respectively corresponding to image 404's component images 414 and 416; image 402's logo 418, corresponding to image 404's logo 420; and image 402's border 422, corresponding to image 404's border 424), and the identified differentiating elements of images 402 and 404 associated with user device 304 (e.g., image 404's menu title element 440, grid element 442, grid element 444, grid element 446, grid element 448, grid element 450, and grid element 452). For example, user device 304 may receive and de-multiplex MPEG-TS 500. Having de-multiplexed, MPEG-TS 500, user device 304 may identity elementary stream 502 as comprising the identified one or more common elements of images 402 and 404 (e.g., based on the PID associated with elementary stream 502 and one or more of an account identifier, an IP address, and/or a MAC address associated with user device 304) and may identity elementary stream 506 as comprising the identified differentiating elements of images 402 and 404 associated with user device 304 (e.g., based on the PID associated with elementary stream 506 and one or more of an account identifier, an IP address, and/or a MAC address associated with user device 304). User device 304 may then render the image comprising the identified one or more common elements of images 402 and 404, and the identified differentiating elements of images 402 and 404 associated with user device 304 by combining elementary streams 502 and 506. It will be appreciated, that the image rendered by user device 304 will substantially correspond to image 404.

By identifying one or more common elements of images 402 and 404 (e.g., image 402's background image 406, corresponding to image 404's background image 408; image 402's component images 410 and 412, respectively corresponding to image 404's component images 414 and 416; image 402's logo 418, corresponding to image 404's logo 420; and image 402's border 422, corresponding to image 404's border 424) and communicating the one or more common elements of images 402 and 404 via a single data stream (e.g., MPEG-TS 500's elementary stream 502), image delivery server 312 may optimize the delivery of images 402 and 404 to user devices 302 and 304, respectively. Communicating the one or more common elements of images 402 and 404 via the single data stream versus redundantly communicating the one or more common elements of images 402 and 404 via their own respective data streams may reduce demand on network 308's resources (e.g., bandwidth). As the number of images and/or the number of common elements shared by the images increases, the demand on network 308's resources may be reduced by correspondingly greater amounts by communicating the one or more common elements of the images via a single data stream versus redundantly communicating the one or more common elements of the images via their own respective data streams.

Figure 6A:
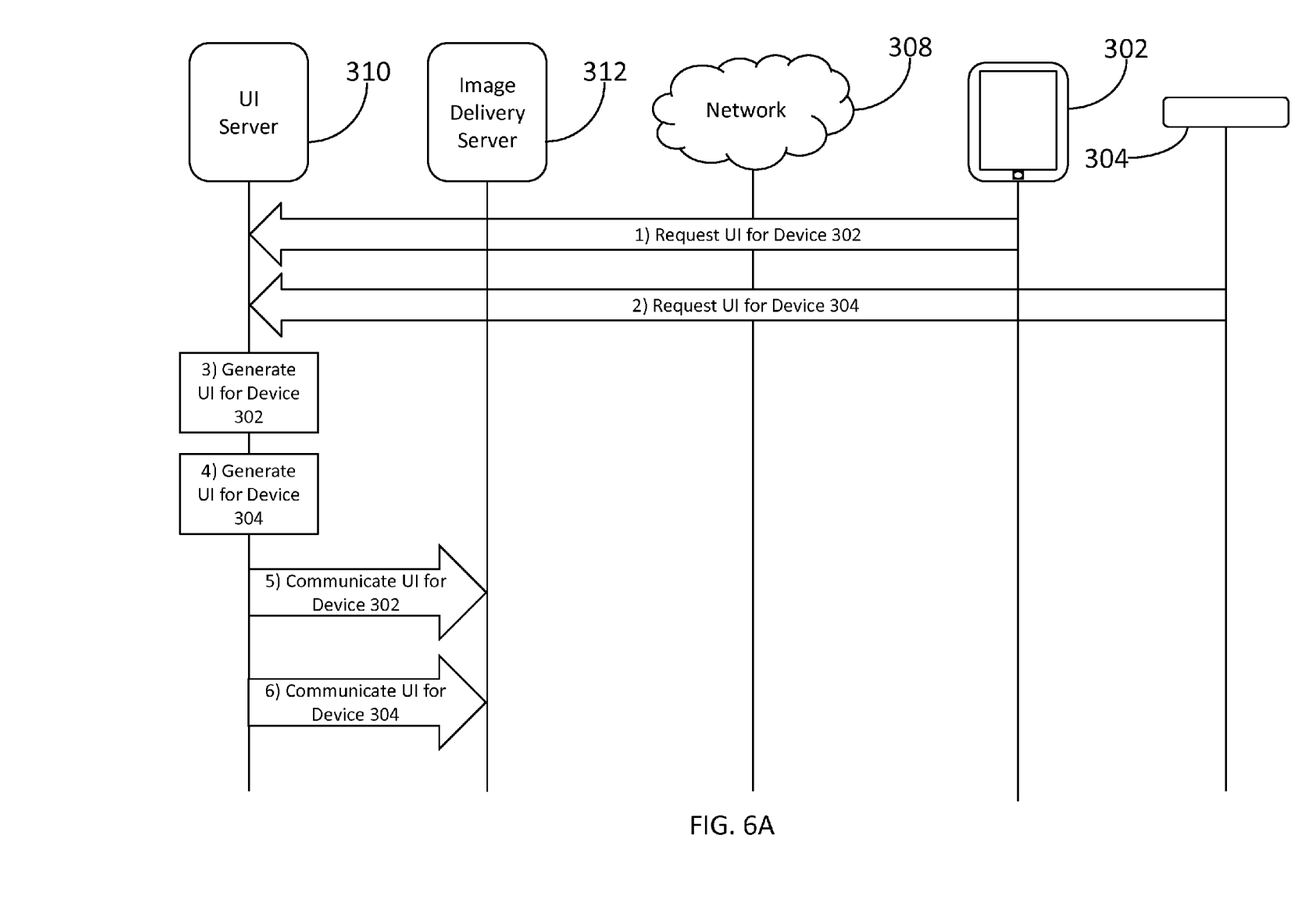
FIGS. 6A and 6B depict an additional illustrative sequence in accordance with one or more aspects of the disclosure.
Figure 6B:
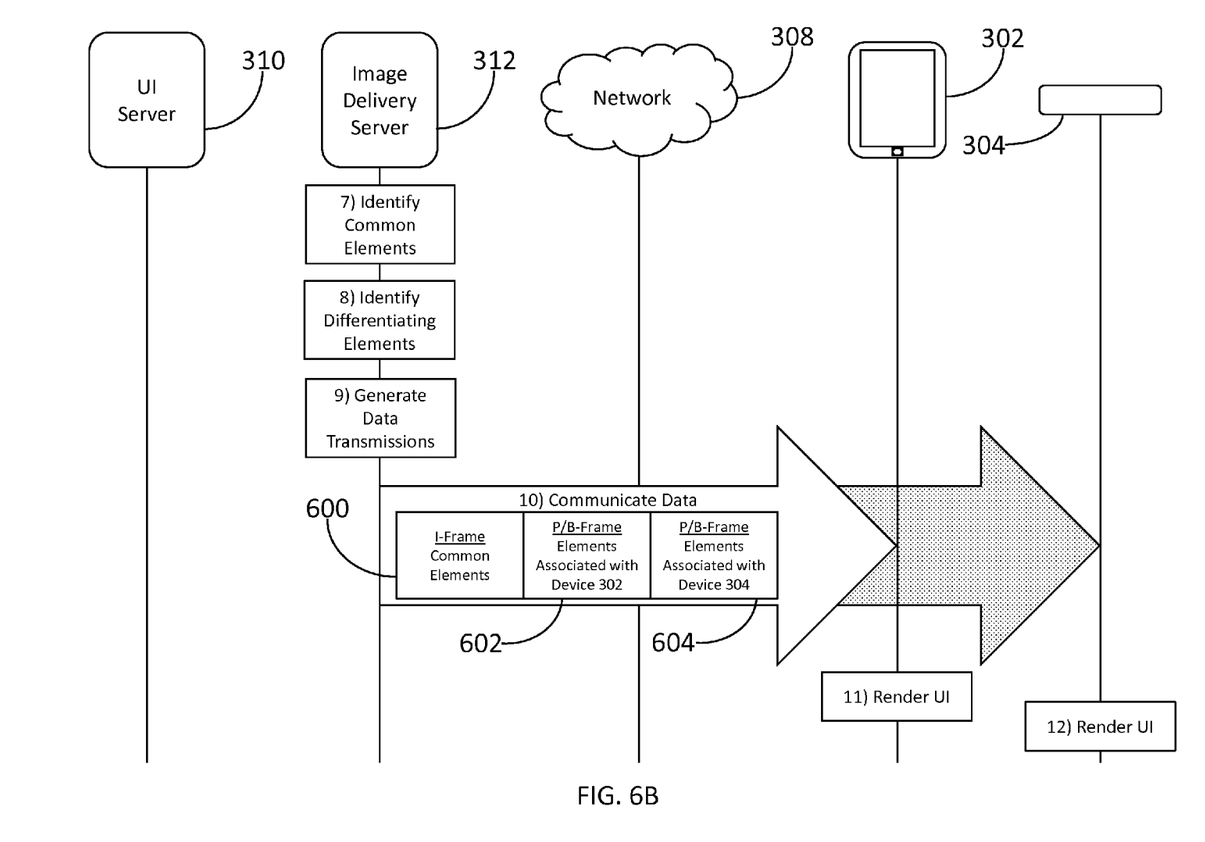

In the embodiment above, different streams are described for transmitting the common and the unique/distinguishing elements for the different images. In some embodiments, the nature of motion-based video encoding can be modified and used advantageously in conveying these streams. Motion-based video encoding may involve using independent frames, or I-frames, which contain sufficient information to generate a complete frame of image data, and dependent frames, such as P- and B-frames, which do not contain sufficient information to generate a complete frame of image data, and instead rely on a corresponding I-frame to fill in the details for the complete frame. In general terms, a P-frame may contain information identifying the differences between a current frame in a video and a prior frame. In some embodiments, a first stream may use independent frames to convey the common images, and rely on two streams of different dependent frames to convey the different images. FIGS. 6A and 6B illustrate an example of this alternative approach.

FIGS. 6A and 6B depict an additional illustrative sequence in accordance with one or more aspects of the disclosure. Referring to FIG. 6A, steps 1-6 may correspond to steps 1-6, described above with respect to FIG. 5A. Referring to FIG. 6B, steps 7-9 may correspond to steps 7-9, described above with respect to FIG. 5B. At step 10, image delivery server 312 may communicate, via network 308, the first data stream to user devices 302 and 304, the second data stream to user device 302, and the third data stream to user device 304. In some embodiments, the first data stream, second data stream, and third data stream may be converted into one or more series of frames and one or more of the frame series may be communicated to user devices 302 and 304. For example, the first data stream comprising the identified one or more common elements of images 402 and 404 may be converted into I-frame 600, the second data stream comprising the portion of the identified differentiating elements of images 402 and 404 associated with user device 302 may be converted into P/B-frame 602, and the third data stream comprising the portion of the identified differentiating elements of images 402 and 404 associated with user device 304 may be converted into P/B-frame 604. I-frame 600 may specify the identified one or more common elements of images 402 and 404. P/B-frame 602 may specify how I-frame 600 should be modified to reflect the identified differentiating elements of images 402 and 404 associated with user device 302. P/B-frame 604 may specify how I-frame 600 should be modified to reflect the identified differentiating elements of images 402 and 404 associated with user device 304.

User device 302 may receive the first data stream and the second data stream and, at step 11, may render an image comprising the identified one or more common elements of images 402 and 404 (e.g., image 402's background image 406, image 402's component images 410 and 412, image 402's logo 418, and image 402's border 422), and the identified differentiating elements of images 402 and 404 associated with user device 302 (e.g., image 402's menu title element 426, grid element 428, grid element 430, grid element 432, grid element 434, grid element 436, and grid element 438). For example, user device 302 may receive I-frame 600 and P/B-frame 602, and may render an image specified by I-frame 600 and then modify the image as specified by P/B-frame 602. It will be appreciated, that the image rendered by user device 302 will substantially correspond to image 402.

Similarly, user device 304 may receive the first data stream and the second data stream and, at step 12, may render an image comprising the identified one or more common elements of images 402 and 404 (e.g., image 402's background image 406, corresponding to image 404's background image 408; image 402's component images 410 and 412, respectively corresponding to image 404's component images 414 and 416; image 402's logo 418, corresponding to image 404's logo 420; and image 402's border 422, corresponding to image 404's border 424), and the identified differentiating elements of images 402 and 404 associated with user device 304 (e.g., image 404's menu title element 440, grid element 442, grid element 444, grid element 446, grid element 448, grid element 450, and grid element 452). For example, user device 302 may receive I-frame 600 and P/B-frame 604, and may render an image specified by I-frame 600 and then modify the image as specified by P/B-frame 604. It will be appreciated, that the image rendered by user device 304 will substantially correspond to image 404.

As indicated above with respect to FIGS. 5A and 5B, by identifying one or more common elements of images 402 and 404 (e.g., image 402's background image 406, corresponding to image 404's background image 408; image 402's component images 410 and 412, respectively corresponding to image 404's component images 414 and 416; image 402's logo 418, corresponding to image 404's logo 420; and image 402's border 422, corresponding to image 404's border 424) and communicating the one or more common elements of images 402 and 404 via a single data stream (e.g., a data stream that includes I-frame 600), image delivery server 312 may optimize the delivery of images 402 and 404 to user devices 302 and 304, respectively. It will also be appreciated that communicating the one or more common elements of images 402 and 404 via the single data stream versus redundantly communicating the one or more common elements of images 402 and 404 via their own respective data streams may reduce demand on network 308's resources (e.g., bandwidth). It will further be appreciated, that as the number of images and/or the number of common elements shared by the images increases, the demand on network 308's resources may be reduced by correspondingly greater amounts by communicating the one or more common elements of the images via a single data stream versus redundantly communicating the one or more common elements of the images via their own respective data streams.

It will be appreciated that the functions and steps described herein are not only applicable to images that comprise UIs, but may be applied to any type of images (e.g., pictures, video) that contain one or more common elements and/or redundancies.

Figure 7A:
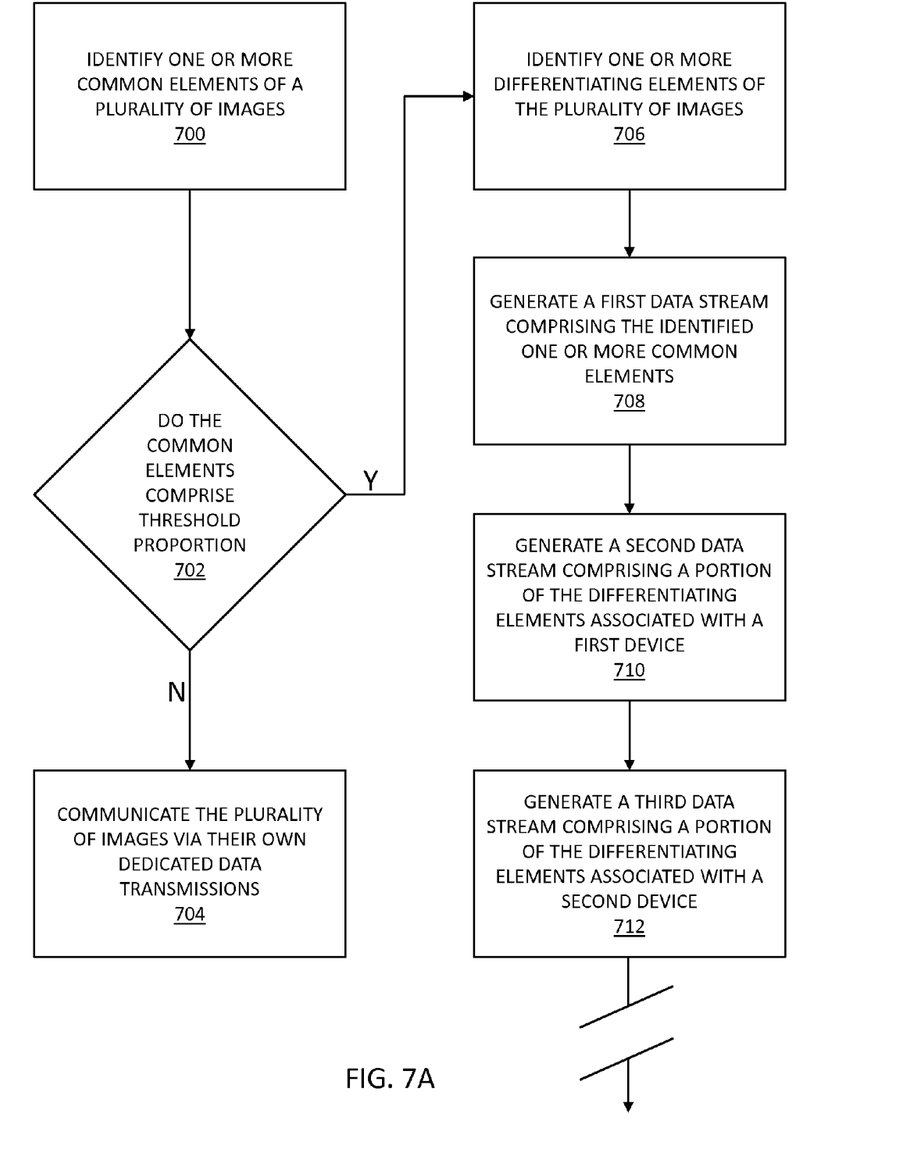
FIGS. 7A and 7B depict an illustrative method in accordance with one or more aspects of the disclosure.

FIGS. 7A and 7B depict an illustrative method in accordance with one or more aspects of the disclosure. Referring to FIG. 7A, at step 700, one or more common elements of a plurality of images may be identified. For example, image delivery server 312 may compare images 402 and 404 and may determine that image 402's background image 406 corresponds to image 404's background image 408, that image 402's component images 410 and 412 respectively correspond to image 404's component images 414 and 416, that image 402's logo 418 corresponds to image 404's logo 420, and that image 402's border 422 corresponds to image 404's border 424. At step 702, a determination may be made as to whether the identified one or more common elements of the plurality of images comprise a threshold proportion of the plurality of images. In some embodiments, the threshold proportion may be based on the total number of the plurality of images. For example, a threshold may indicate that 80% of the images appearing in two displays must be common before the system will bother with generating the streams to carry the common and unique elements separately. If two displays have less than 80% images in common, then the system can simply transmit the displays, in their entirety, using two separate streams. The threshold may be measured based on pixel count (e.g., 80% of the pixels between two displays), or on image object count (e.g., 80% of the graphical objects, such as buttons, lines, shapes, logos, etc., regardless of the actual pixel size), or by any other desired measure. Responsive to determining that the identified one or more common elements of the plurality of images do not comprise the threshold proportion of the plurality of images, at step 704, the plurality of images may be communicated via their own dedicated data transmissions. For example, responsive to determining that the identified one or more common elements of the plurality of images do not comprise the threshold proportion of the plurality of images, the plurality of images may be communicated via their own dedicated data transmissions.

Returning to step 702, responsive to determining that the identified one or more common elements of the plurality of images do comprise the threshold proportion of the plurality of images, at step 706, one or more differentiating elements of the plurality of images may be identified. For example, responsive to determining that the identified one or more common elements of images 402 and 404 do comprise the threshold proportion of the plurality of images, image delivery server 312 may identify one or more differentiating elements of images 402 and 404. For example, image delivery server 312 may compare images 402 and 404 and may determine that image 402's menu title element 426, grid element 428, grid element 430, grid element 432, grid element 434, grid element 436, and grid element 438 respectively differ from image 404's menu title element 440, grid element 442, grid element 444, grid element 446, grid element 448, grid element 450, and grid element 452. At step 708, a first data stream comprising the identified one or more common elements may be generated. For example, image delivery server 312 may generate a first data stream comprising the identified one or more common elements of images 402 and 404. At step 710, a second data stream comprising a portion of the differentiating elements associated with a first device may be generated. For example, image delivery server 312 may generate a second data stream comprising a portion of the identified differentiating elements of images 402 and 404 associated with user device 302. At step 712, a third data stream comprising a portion of the differentiating elements associated with a second device may be generated. For example, image delivery server 312 may generate a third data stream comprising a portion of the identified differentiating elements of images 402 and 404 associated with user device 304.

Figure 7B:
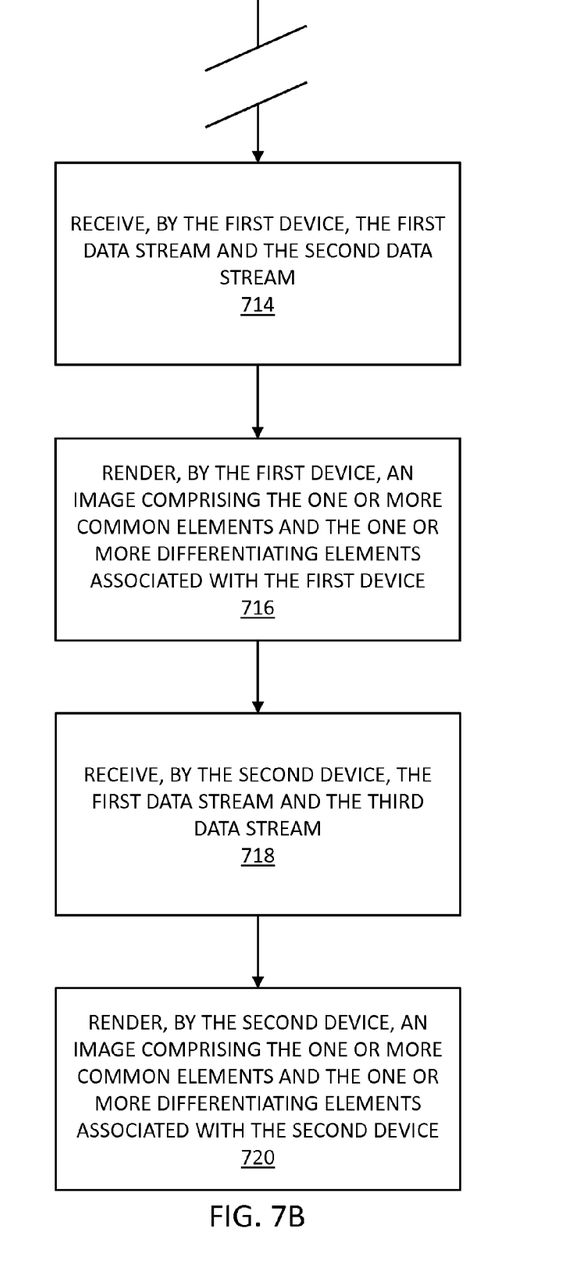

Referring to FIG. 7B, at step 714, the first data stream and the second data stream may be received by the first device. For example, user device 302 may receive the first data stream comprising the identified one or more common elements of images 402 and 404, and the second data stream comprising the portion of the identified differentiating elements of images 402 and 404 associated with user device 302. At step 716, the first device may render an image comprising the one or more common elements and the one or more differentiating elements associated with the first device. For example, user device 302 may render an image comprising the identified one or more common elements of images 402 and 404, and the portion of the identified differentiating elements of images 402 and 404 associated with user device 302. At step 718, the first data stream and the third data stream may be received by the second device. For example, user device 304 may receive the first data stream comprising the identified one or more common elements of images 402 and 404, and the third data stream comprising the portion of the identified differentiating elements of images 402 and 404 associated with user device 304. At step 720, the second device may render an image comprising the one or more common elements and the one or more differentiating elements associated with the second device. For example, user device 304 may render an image comprising the identified one or more common elements of images 402 and 404, and the portion of the identified differentiating elements of images 402 and 404 associated with user device 304.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, any of the features described herein may be combined with any or all of the other features described herein.

The various features described above are merely nonlimiting examples, and can be rearranged, combined, subdivided, omitted, and/or altered in any desired manner. For example, features of the servers can be subdivided among multiple processors and computing devices. The true scope of this patent should only be defined by the claims that follow.

What is claimed is:

1. A method comprising:
   determining, by a computing device, a first user interface (UI) to be transmitted to a first device;
   determining, by the computing device, a second UI that is different from the first UI and that is to be transmitted to a second device;
   determining, by the computing device, a number of common pixels that are in common between the first UI and the second UI;
   determining that a ratio=the number of common pixels/a total number of pixels for the first UI and the second UI satisfies a threshold; and
   in response to the determining that the ratio satisfies the threshold:
      generating, by the computing device, a first data stream comprising one or more common elements that are in common between the first UI and the second UI;
      generating, by the computing device, a second data stream comprising a first group of differentiating elements that are unique to the first UI; and
      generating, by the computing device, a third data stream comprising a second group of differentiating elements that are unique to the second UI.

2. The method of claim 1, wherein the first data stream, the second data stream, and the third data stream each comprise elementary streams of a Moving Picture Experts Group Transport Stream (MPEG-TS), the method further comprising:
   transmitting the first data stream to the first device and the second device;
   transmitting the second data stream to the first device; and
   transmitting the third data stream to the second device.

3. The method of claim 2, wherein the MPEG-TS comprises a Program Map Table (PMT) comprising a plurality of Packet Identifiers (PIDs), and wherein a first of the plurality of PIDs identifies the first data stream, a second of the plurality of PIDs identifies the second data stream, and a third of the plurality of PIDs identifies the third data stream.

4. The method of claim 3, wherein the second of the plurality of PIDs comprises one or more of an account identifier associated with the first device, an Internet Protocol (IP) address associated with the first device, or a Media Access Control (MAC) address associated with the first device, and wherein the third of the plurality of PIDs comprises one or more of an account identifier associated with the second device, an IP address associated with the second device, or a MAC address associated with the second device.

5. The method of claim 1, further comprising:
   converting, by the computing device, the one or more common elements into one or more I-frames, wherein the one or more I-frames comprise the first data stream;
   converting, by the computing device, the first group of differentiating elements into one or more P-frames or one or more B-frames, wherein the one or more P-frames or one or more B-frames comprise the second data stream; and
   converting, by the computing device, the second group of differentiating elements into one or more P-frames or one or more B-frames, wherein the one or more P-frames or the one or more B-frames comprise the third data stream.

6. The method of claim 1, wherein the one or more common elements are determined based on a pixel count of the number of common pixels.

7. The method of claim 5, further comprising:
   causing the first device to display the first UI using the first data stream and the second data stream, wherein the one or more I-frames comprising the first data stream are modified as specified by the one or more P-frames or the one or more B-frames comprising the second data stream.

8. The method of claim 5, further comprising:
   causing the second device to display the second UI using the first data stream and the third data stream, wherein the one or more I-frames comprising the first data stream are modified as specified by the one or more P-frames or the one or more B-frames comprising the third data stream.

9. The method of claim 1, wherein the one or more common elements comprise one or more of a background image, a component image, a logo, or a border, and wherein the first group of differentiating elements and the second group of differentiating elements comprise one or more elements of a program listing.

10. A method comprising:
   determining a number of common elements that are in common between a first UI associated with a first device and a second UI associated with a second device;
   determining that a ratio=the number of common elements/a total number of elements for the first UI and the second UI satisfies a threshold; and
   in response to the determining that the ratio satisfies the threshold:
      converting one or more common elements that are in common between the first UI and the second UI into one or more I-frames of a first data stream;

transmitting the first data stream to the first device and the second device;

determining a first group of differentiating elements between the first UI and the second UI that are associated with the first UI;

converting the first group of differentiating elements into one or more P-frames or one or more B-frames of a second data stream;

determining a second group of differentiating elements between the first UI and the second UI that are associated with the second UI;

converting the second group of differentiating elements into one or more P-frames or one or more B-frames of a third data stream;

transmitting the second data stream to the first device; and transmitting the third data stream to the second device.

11. The method of claim 10, wherein the first data stream, the second data stream and the third data stream each comprise elementary streams of a Moving Picture Experts Group Transport Stream (MPEG-TS).

12. The method of claim 11, further comprising:

causing the first device to display the first UI using the first data stream and the second data stream, wherein the one or more I-frames of the first data stream are modified as specified by the one or more P-frames or one or more B-frames of the second data stream.

13. The method of claim 12, further comprising:

causing the second device to display the second UI using the first data stream and the third data stream, wherein the one or more I-frames of the first data stream are modified as specified by the one or more P-frames or the one or more B-frames of the third data stream.

14. The method of claim 10 wherein the common elements are determined based on a pixel count of a number of pixels in common between the first UI and the second UI or on a UI object count of a number of UI objects in common between the first UI and the second UI.

15. A method comprising:

determining, by a computing device, a number of common objects associated with a first user interface (UI) and a second UI;

determining that a ratio=the number of common objects/a total number of objects for the first UI and the second UI satisfies a threshold; and in response to the determining that the ratio satisfies the threshold:

determining a first group of differentiating objects between the first UI and the second UI, wherein the first group of differentiating objects is associated with the first UI, and wherein the first group of differentiating objects comprises a graphical object requested by a first user via the first UI;

determining a second group of differentiating objects between the first UI and the second UI, wherein the second group of differentiating objects is associated with the second UI;

generating a first data stream comprising the first group of differentiating objects;

generating a second data stream comprising the second group of differentiating objects; and generating a third data stream comprising the common objects.

16. The method of claim 15, wherein the common objects comprise one or more of a background image, a component image, a logo, or a border, and wherein the graphical object comprises a portion of a program guide listing.

17. The method of claim 15, wherein the first data stream, the second data stream and the third data stream each comprise elementary streams of a Moving Picture Experts Group Transport Stream (MPEG-TS).

18. The method of claim 17, wherein the MPEG-TS comprises a Program Map Table (PMT) comprising a plurality of Packet Identifiers (PIDs), and wherein a first of the plurality of PIDs identifies the first data stream, a second of the plurality of PIDs identifies the second data stream, and a third of the plurality of PIDs identifies the third data stream.

19. The method of claim 18, wherein the second of the plurality of PIDs comprises one or more of an account identifier associated with a first device, an Internet Protocol (IP) address associated with the first device, or a Media Access Control (MAC) address associated with the first device, and wherein the third of the plurality of PIDs comprises one or more of an account identifier associated with a second device, an IP address associated with the second device, or a MAC address associated with the second device.

20. The method of claim 15, further comprising:

generating the first UI using the first data stream and the third data stream, wherein the third data stream is modified as specified by the first data stream; and generating the second UI using the second data stream and the third data stream, wherein the third data stream is modified as specified by the second data stream.

* * * * *